(12) United States Patent
Bezancon et al.

(10) Patent No.: US 9,390,136 B2
(45) Date of Patent: Jul. 12, 2016

(54) SYSTEM AND METHOD OF IDENTIFYING RELEVANCE OF ELECTRONIC CONTENT TO LOCATION OR PLACE (75) Inventors: Anne Bezancon, Oakland, CA (US); Daniel Parkes, San Francisco, CA (US)

(73) Assignee: 1020, Inc., San Francisco, CA (US)

( * ) Notice: Subject to any disclaimer, the term of this patent is extended or adjusted under 35 U.S.C. 154(b) by 1913 days.

(21) Appl. No.: 12/400,718

(22) Filed: Mar. 9, 2009

(65) Prior Publication Data
US 2010/0205194 A1 Aug. 12, 2010

Related U.S. Application Data (60) Provisional application No. 61/152,192, filed on Feb. 12, 2009.

(51) Int. Cl.
*G06F 17/30* (2006.01)

(52) U.S. Cl.
CPC .... *G06F 17/30528* (2013.01); *G06F 17/30241* (2013.01)

(58) Field of Classification Search
CPC ................................................ G06F 17/30528
USPC ........................................................ 707/758
See application file for complete search history.

(56) References Cited

U.S. PATENT DOCUMENTS

| | | | |
|---|---|---|---|
| 5,740,549 A | 4/1998 | Reilly et al. | |
| 5,835,061 A | 11/1998 | Stewart | |
| 5,937,392 A | 8/1999 | Alberts | |
| 5,948,061 A | 9/1999 | Merriman et al. | |
| 5,969,678 A | 10/1999 | Stewart | |
| 5,991,739 A | 11/1999 | Cupps | |
| 6,119,098 A | 9/2000 | Guyot et al. | |
| 6,259,405 B1 | 7/2001 | Stewart et al. | |
| 6,326,918 B1 | 12/2001 | Stewart | |
| 6,452,498 B2 | 9/2002 | Stewart | |
| 6,487,538 B1 | 11/2002 | Gupta et al. | |

(Continued)

FOREIGN PATENT DOCUMENTS

| | | |
|---|---|---|
| WO | WO 2007/131001 A2 | 11/2007 |
| WO | WO 2007/131003 A2 | 11/2007 |

(Continued)

OTHER PUBLICATIONS

U.S. Appl. No. 10/886,502, filed Jul. 6, 2004, Bezancon.

(Continued)

*Primary Examiner* — Syling Yen
(74) *Attorney, Agent, or Firm* — DLA Piper LLP (US)

(57) ABSTRACT

A system and method for processing electronic information that includes generating a plurality of identifier codes each of which corresponds to a location and/or a place, receiving a plurality of electronic information, wherein each electronic information has a relevancy to one or more locations and/or places, associating each of the received plurality of electronic information with any of the identifier codes that correspond to the one or more locations and/or places having the relevancy to the electronic information, receiving a query relevant to at least one of the locations and/or places, identifying any of the identifier codes that correspond to the at least one of the locations and/or places relevant to the query, and responding to the query by providing the electronic information that are associated with the identified identifier codes.

6 Claims, 5 Drawing Sheets

(56) References Cited

U.S. PATENT DOCUMENTS

| | | |
|---|---|---|
| 6,553,310 B1 | 4/2003 | Lopke |
| 6,601,046 B1 | 7/2003 | Epstein |
| 6,629,136 B1 | 9/2003 | Naidoo |
| 6,697,018 B2 | 2/2004 | Stewart |
| 6,759,960 B2 | 7/2004 | Stewart |
| 6,795,700 B2 | 9/2004 | Karaoguz et al. |
| 6,798,358 B2 | 9/2004 | Joyce et al. |
| 6,799,032 B2 | 9/2004 | McDonnell et al. |
| 6,819,267 B1 | 11/2004 | Edmark et al. |
| 6,832,373 B2 | 12/2004 | O'Neill |
| 6,845,400 B2 | 1/2005 | Mapherson et al. |
| 6,848,542 B2 | 2/2005 | Gailey et al. |
| 6,912,545 B1 | 6/2005 | Lundy et al. |
| 6,920,464 B2 | 7/2005 | Fox |
| 6,983,313 B1 | 1/2006 | Korkea-aho |
| 6,990,462 B1 | 1/2006 | Wilcox et al. |
| 7,009,556 B2 | 3/2006 | Stewart |
| 7,039,599 B2 | 5/2006 | Merriman et al. |
| 7,058,594 B2 | 6/2006 | Stewart |
| 7,150,030 B1 | 12/2006 | Eldering et al. |
| 7,403,942 B1 * | 7/2008 | Bayliss .................. 707/748 |
| 7,730,389 B2 | 6/2010 | Rasmussen et al. |
| 7,930,729 B2 | 4/2011 | Sim et al. |
| 2001/0029426 A1 | 10/2001 | Hancock et al. |
| 2001/0049671 A1 * | 12/2001 | Joerg ...................... 706/50 |
| 2001/0054009 A1 | 12/2001 | Miller et al. |
| 2002/0082931 A1 | 6/2002 | Siegel et al. |
| 2003/0061206 A1 | 3/2003 | Qian |
| 2003/0135581 A1 | 7/2003 | Phalen et al. |
| 2003/0225725 A1 | 12/2003 | Miller et al. |
| 2004/0083237 A1 | 4/2004 | Burnett |
| 2004/0139049 A1 * | 7/2004 | Hancock et al. ................ 707/1 |
| 2004/0181807 A1 | 9/2004 | Theiste et al. |
| 2004/0209602 A1 | 10/2004 | Joyce et al. |
| 2004/0243307 A1 | 12/2004 | Geelen |
| 2005/0114672 A1 * | 5/2005 | Duncan et al. ................. 713/182 |
| 2005/0119824 A1 | 6/2005 | Rasmussen et al. |
| 2005/0282556 A1 | 12/2005 | Morris |
| 2007/0140439 A1 | 6/2007 | Olrik et al. |
| 2007/0260531 A1 | 11/2007 | Bezancon |
| 2007/0260741 A1 | 11/2007 | Bezancon |
| 2008/0109885 A1 | 5/2008 | Sim et al. |
| 2008/0228392 A1 | 9/2008 | Fuchs |
| 2008/0256044 A1 | 10/2008 | Anderson et al. |
| 2008/0275759 A1 | 11/2008 | Parkes et al. |
| 2009/0063293 A1 | 3/2009 | Mirrashidi et al. |

FOREIGN PATENT DOCUMENTS

| | | |
|---|---|---|
| WO | WO 2007/131001 A3 | 12/2007 |
| WO | 2008 010699 A1 | 2/2008 |

OTHER PUBLICATIONS

U.S. Appl. No. 12/339,582, filed Dec. 19, 2008, Parkes et al.
U.S. Appl. No. 12/339,603, filed Dec. 19, 2008, Parkes et al.
U.S. Appl. No. 12/367,477, filed Feb. 6, 2009, Parkes et al.
Search Report and Written Opinion issued in corresponding PCT Application No. PCT/US2010/023743, dated Apr. 16, 2010, 11 pgs.
Search Report and Written Opinion issued in corresponding PCT Application No. PCT/US2010/023746, dated Apr. 7, 2010, 11 pgs.
Taylor, "The World is your JavaScript-Enabled Oyster," URL: http://googleblog.blogspot.com/2005/06/world-is-your-javascript-enabled_29.html. (one page) Jun. 2005.
Neville, et al., "How to create a map that displays a maker with latitude/longitude info," URL:http://groups.google.com/group/google-maps-api/browse_thread/thread36ef3c5c22320cae/6e701081163a369c. (two pages) Jan. 2006.

* cited by examiner

SYSTEM AND METHOD OF IDENTIFYING RELEVANCE OF ELECTRONIC CONTENT TO LOCATION OR PLACE

RELATED APPLICATIONS

This application claims the benefit of U.S. Provisional Application No. 61/152,192, filed Feb. 12, 2009.

FIELD OF THE INVENTION

The present invention relates to information databases and networks, and more particularly to a system and method for identifying the relevance of electronic information to known and new locations and places.

BACKGROUND OF THE INVENTION

Location-based information was traditionally a simplistic association between a given location (e.g. street address) and information about the tenants or uses of that location. For example, the location identified by the address 123 Elm street could be associated with a resident of that location (e.g. John Smith), or a business at that location (e.g. a motorcycle shop under the name Dave's Bikes), along with a telephone number. This association was traditionally published in telephone phone books, with listings by residential name, business name and/or business category. Some locations include multiple tenants or uses. For these locations, a floor, suite, unit or apartment number was traditionally used to differentiate one tenant/use from another at the same address location.

With the advent of the Internet, wireless networks, and portable electronic devices, there has been an explosion of location-based information that can be created, stored and disseminated. The problem arises as to how to collect and organize this information for each location, and/or for each of the tenants/uses at each location, so that the information can be accessed and used in an efficient manner. For example, take the simple situation of a location having an address of "123 Main Street, Anytown, USA", which has a building with multiple tenants: a restaurant (named "The Restaurant") on the first floor, an advertising agency (named "The Agency") on the second floor, and a personal residence ("The Residence") on the third floor. There are various types of location-based information for these tenants, some shared and some unique. For example, each tenant has the same location information associated with it (e.g. the 123 Main Street address), as well as unique location information (e.g. the floor/suite/unit/apartment number, telephone number, business type, business hours, etc.). Other information can be associated just with The Restaurant (e.g. food reviews, event listings, business WiFi access, other publicity, etc.), with just The Agency (articles, campaigns, client reviews, business WiFi access, other publicity, etc.), and with just The Residence (e.g. personal information, personal WiFi access, other publicity, etc.). Building or neighborhood information can be associated with one, two or all three tenants. Collecting, associating and sharing location based information is problematic since all three tenants share the same location.

To make matters even more confusing, there are numerous ways to make reference to a single tenant at a location. For example, each tenant can be referenced by a suite number, by a floor number, by an abbreviated name, by a full name, etc. Moreover, the address itself can be expressed in different ways, such as 123 Main Street, 123 Main St., 123 Main, etc. Lastly, various commercial entities use different ID schemes to identify the same location or tenant. For example, a delivery company may use one ID code for The Restaurant, while an events website may use another ID code for The Restaurant at which events are occurring. When different schemes are used to identify the same location, and/or the same tenant at that location, it becomes difficult to receive information about that location from various sources, properly associate the information with the location and/or its tenants, and share that associated information with others.

There is a need for a system and method that can efficiently and accurately associate electronic information with the relevant location(s), and provide, link or point to that electronic information based upon that association, especially when the identified location itself is insufficient to adequately associate the information to the proper tenant/use of that location.

BRIEF SUMMARY OF THE INVENTION

The aforementioned problems and needs are addressed by a method of processing electronic information that includes generating a plurality of identifier codes each of which corresponds to a location and/or a place, receiving a plurality of electronic information, wherein each electronic information has a relevancy to one or more locations and/or places, associating each of the received plurality of electronic information with any of the identifier codes that correspond to the one or more locations and/or places having the relevancy to the electronic information, receiving a query relevant to at least one of the locations and/or places, identifying any of the identifier codes that correspond to the at least one of the locations and/or places relevant to the query, and responding to the query by providing the electronic information that are associated with the identified identifier codes.

A system for processing electronic information includes an association module in communication with a network. The association module is configured to generate a plurality of identifier codes each of which corresponds to a location and/or a place, receive a plurality of electronic information from the network, wherein each electronic information has a relevancy to one or more locations and/or places, associate each of the received plurality of electronic information with any of the identifier codes that correspond to the one or more locations and/or places having the relevancy to the electronic information, receive a query relevant to at least one of the locations and/or places, identify any of the identifier codes that correspond to the at least one of the locations and/or places relevant to the query, and respond to the query by providing the electronic information that are associated with the identified identifier codes.

Other objects and features of the present invention will become apparent by a review of the specification, claims and appended figures.

DETAILED DESCRIPTION OF THE INVENTION

The present invention is a system and method that associates electronic information using a unique place identifier code ("LPIC") for each location or "place" at any given location. In doing so, location based information from different users can be received or identified, properly associated with the location and/or its various tenants/uses, and shared with others.

Figure 1:
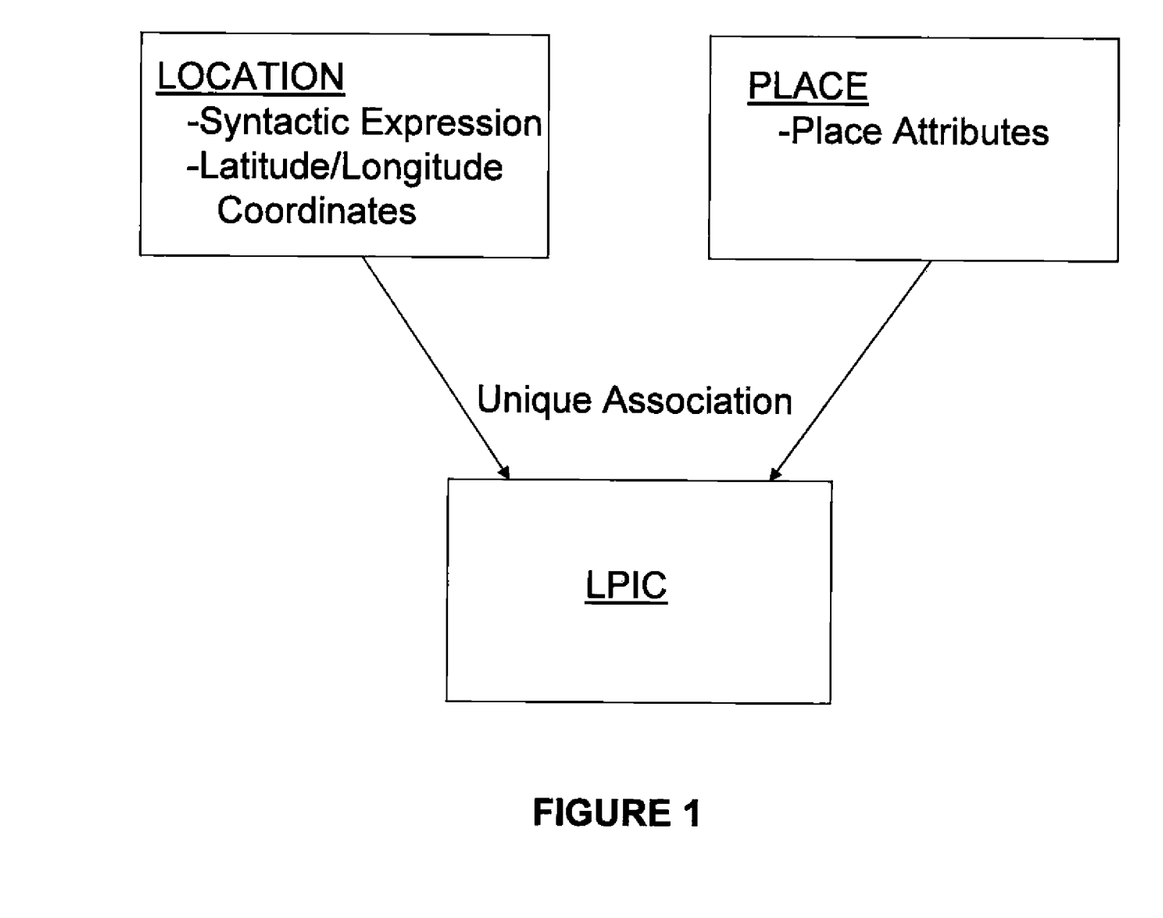
FIG. 1 is a diagram illustrating the association of a LPIC with a location and a place at that location.

FIG. 1 illustrates the use of the LPIC. Each LPIC is associated with a location or a "place" at that location. Location identifies a point or 2-dimensional polygonal or elliptical area on the earth's surface. Location is typically expressed as a syntactic expression. Examples of syntactic location expressions include street address, building name, neighborhood name, city, county, state, province, country, park, or any other region designation. Location can alternately and/or additionally be expressed by longitude/latitude coordinates that define the point or area. "Place" separately defines the use(s) or tenant(s) at any given location using place attributes. Using the above example, the building at the location 123 Main Street, Anytown, USA, defines three different "places": a restaurant (The Restaurant) on the first floor, an advertising agency (The Agency) on the second floor, and a personal residence (The Residence) on the third floor. Each of these places has place attributes associated with it that can differentiate that place from other places at that location or at other locations. Place attributes can include name, phone number, brand of business, category of business, business hours, etc. Place attributes can also include information such as floor, suite, unit, apartment number, etc. to help identify relative position of the multiple tenants/uses within the same location. Each place and/or location is associated with a unique LPIC, which is a number, an alpha string, an alpha-numeric string, or any other type of code unique to that place, that place at that location, or that location.

Figure 2:
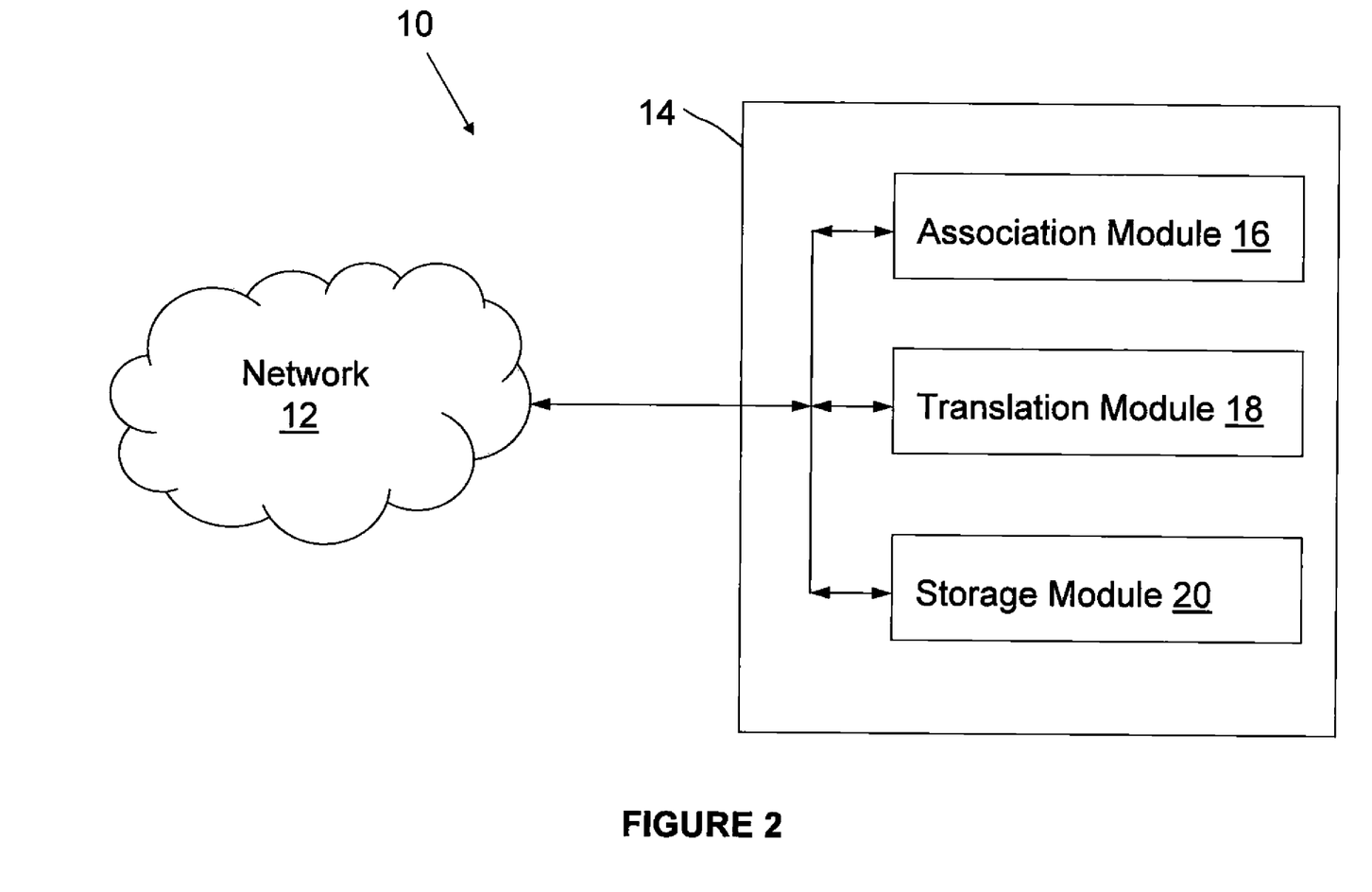
FIG. 2 is a diagram illustrating the components of the system of the present invention.

FIG. 2 illustrates the system 10 of the present invention, which includes a network 12 connected to a data storage system 14. The data storage system 14 includes an association module 16, a translation module 18, and a storage module 20. The network 12 can be one or more point to point connections, a single network (e.g. the Internet), nested networks and/or multiple interconnected or separate networks. Network 12 can be wired and/or wireless. Storage module 20 can be any storage device for storing electronic information, including one or more volatile and/or non-volatile memory and storage devices physically located together or separately. When electronic information is received by or identified to the system 10, it can be associated with all the relevant location(s) and/or place(s) by simply associating it with the relevant LPIC(s).

The electronic information received from the network 12 can include at least four types of information: 1) location information (e.g. syntactic expressions, LAT/LONG coordinates), 2) place attribute information, 3) alias codes, and 4) electronic content. Location information can include syntactic expressions of location and/or latitude/longitudinal coordinates. Place attribute information can include those attributes listed above that define "place." Alias codes are third party codes used to refer to locations and/or places. Electronic content can include text, images, photographs, video, internet links, etc. that can be associated with specific locations and/or places. Specific examples of electronic content can include, but certainly are not limited to, business reviews, articles, event announcements and listings, customer and visitor information, publicity, advertising, weather, traffic, classified ads, etc. Sources of the electronic information can include directories, review and event publications, chat rooms, electronic bulletin boards, web sites, vendor and public data bases, e-mail, text messages, location tagged information, etc.

The data storage system 14 stores the associations between electronic information, as well as possibly some or all of the electronic information itself, in the following manner. When electronic information is received by system 14, the association module 16 detects and identifies location and/or place attribute information therein. If the detected location and/or place attribute information corresponds to a new place and/or location not yet defined in the system 14, a unique LPIC is generated for this particular place and/or location. Any electronic information received now or in the future for this new place and/or location will be associated with this generated LPIC. The generated LPIC and its location and place information are stored in storage module 20. Alternately, if the received electronic information corresponds (i.e. has a relevancy) to a place and/or location already defined in the system 14, then the association module 16 associates that information with the existing LPIC for that defined place and/or location. Any additional location and/or place information in the received electronic information is stored on storage module 20 in a manner where it is associated with the existing LPIC. It should be understood that received electronic information could be relevant to multiple different locations/places, and therefore such information could be associated with the appropriate multiple LPICs.

Some of the received electronic information may include alias codes that certain users utilize to identify a location or a place. For example, a User A could be a vendor that tags electronic content with its own alias code to identify the address location 123 Main Street, which would apply to all three tenants in the above example. A User B could be a different vendor that tags electronic content with its own alias code to identify just The Restaurant. When alias codes are used, translation module 18 translates the alias code to the appropriate LPIC(s), which are then associated with the received electronic information. This feature is beneficial because even though different users are using different alias codes to refer to the same location and/or place, the information is associated with that location/place using a single LPIC association scheme. As explained in more detail below, the information can also be efficiently retrieved utilizing the LPIC association scheme, even though different queries from different users utilizing different alias codes for the same location/place are used.

Ideally, all components of the received electronic information (location information, place information, alias information and electronic content) would be stored in storage module 20. In reality, however, a single storage device or system could not possibly store all the electronic information accessible by large networks such as the Internet. Therefore, it is preferable that storage module 20 instead store links or pointers to the electronic content portion of the electronic information, so that it can access or point to the electronic content rather than store it. For example, in the case where the received electronic information is a review of The Restaurant, the location and place portion of the information would be associated with the LPIC for The Restaurant and stored in the storage module 20. However, with respect to the electronic content portion of the electronic information (which usually takes up most of the size of the electronic information), the storage module 20 could simply store the link to where the actual review is stored and can be accessed on the reviewer's storage system (e.g. such as the URL of the reviewer's website or an RSS feed). In this way, the system 14 becomes a location/place association engine without having to store the underlying electronic content, in much the same way an Internet search engine locates electronic content without having to store it locally. In fact, if the location and place portion of the electronic information is sufficient to identify all the relevant LPICs, there would be no need to send the electronic content portion to the system 14 as well.

If the location and place portions of the electronic information fail to include sufficient location and/or place information to identify for certain which place(s)/location(s) it is relevant to, the association module 16 could scan the electronic content portion itself looking for information that helps determine which LPIC(s) the content should be associated with. For example, if the electronic content is a photograph, and includes a user caption that helps identify a location and/or place, then the association module 16 can utilize that caption information to associate the electronic content with the proper LPIC(s). This could be done by receiving and locally storing the electronic content in storage module 20, or accessing the electronic content at a remote storage location. Thus, the electronic content need not necessarily be stored locally in storage module 20 in order to scan it for location and place information.

The association module 16 uses information found in the electronic information to associate it with the appropriate LPICs, preferably starting with the most definitive and reliable first. For instance, the association module 16 would first rely on any actual LPIC(s) included within the electronic information. The next most reliable information useful for LPIC association that might be found in the electronic information would be an alias code. After that, the association module 16 would look for any type of known geo-location ID codes that could be used to identify specific location(s). The association module 16 would also look for any geo-codes containing latitude and longitude coordinates that (using a fuzzy match process) can be correlated to the locations for one or more LPICs. Link IDs can also be used, which are well known street segment identifiers that have been used to approximate latitude and longitude coordinates of an address location along a street where the address locations at the street segment ends are known. The association module 16 can also conduct a keyword search of the electronic information looking for words that are relevant to one or more of the known LPICs. If address information is found, it can be sent out to a geo-coding service that will return with a geo-code relevant to one or more LPICs. If the information found in the electronic information is insufficient to associate with an LPIC or references external sources of additional information, the association module 16 can access external sources of information over network 12 in order to adequately associate the electronic information to the relevant LPICs.

The association module 16 preferably includes conflicts resolution functionality, to resolve conflicts contained in the incoming electronic information. Conflicting place and/or location information in the incoming electronic information can be expected given the numerous possible sources of such information, and the dynamic nature of this type of information. For example, multiple received electronic information could identity different place attributes for the same location (e.g. two different business names and/or other attributes such as operating hours at the same address). Without independent human confirmation, it would be difficult to determine which is accurate or more up to date, which is not feasible for large numbers of incoming electronic information. Therefore, the association module 16 uses conflicts resolution factors to determine which conflicting electronic information to use and which to discard as they pertain to the same LPIC. Examples of conflicts resolution factors include the source of the information (some sources are more reliable and/or more up to date), the number of times the information is received by different sources (consensus), and the frequency at which the various information are received (giving higher priority to information received more frequently).

As part of its association functionality, the association module 16 determines whether an incoming electronic information represents a new location or place (for which a new LPIC should be generated) versus an existing location or place (for which an LPIC already exists). The difficulty results when some but not all of the new information matches that already stored for an existing LPIC. For example, with an electronic information containing an address, a category, a suite number, a name, a phone number, and a URL, some but not all of this information matches that of an existing LPIC. In order to determine if this new information represents a new location/place, a fuzzy matching logic can be used where weight tables and thresholds for hits and misses are used. To illustrate, an address match could correlate to +3 points, and an address mismatch could correlate to −2 points. A phone number match could correlate to a +3 points, and an address mismatch could correlate to a −1 point, and so on. The point values assigned to the various informational matches and mismatches could provide the proper weights for the various types of information. If the total point value meets a predetermined threshold, then the information is associated with the existing LPIC (and the information associated with the existing LPIC is updated). Otherwise, the received electronic information is associated with a new LPIC.

There are alternate ways to deal with conflicts resolutions, and/or new versus existing location/place determines. In close cases, the association module 16 can conduct automated searches of other data bases on the network 12 to resolve the conflict or determine if an existing LPIC is implicated. Close cases can also be slated for human intervention to make the final determination of which conflicting information should be used or whether an existing LPIC is implicated. In the situation where conflicting information exists for the same LPIC, both sets of conflicting information can be associated with the LPIC, such that in response to subsequent queries implicating that LPIC, both sets of information can be provided, along with an indication, score or percentage regarding the relative reliability of each set of information.

The electronic information stored in module 20 is comprised of several elements or data field types which can each have various levels of accuracy or veracity. Certain elements require a higher level of accuracy or veracity than others to maintain the integrity of the system. Consequently, the required level of trustworthiness of the source contributing the electronic information can vary. A user's credibility is established by an external authentication process and results in multi-level access rights policies. For example, user A can create a new place, update either all or only some of the attributes of a place they created (but not a place another user created), and delete a place they created, while user B cannot create a new place but can create or update non-critical information about a place created by another user, and user C can only "read" information without any access rights to add or modify any information. These multi-level access rights policies can be passive as well (e.g. information from user A can be relied upon by the system to create a new place, update either all or only some of the attributes of a place created from user A information but not a place created by another user's information, while information from user B would not be relied upon to create a new place but would be relied upon to create or update non-critical information about a place created by another user's information, and user C can only "read" information such that no information from user C would be relied upon to add or modify any information).

Additionally, the number of users contributing the same categories of information about a given place over a given period of time can indicate which information is most likely correct in the case of a conflict. For example, the stored information for a defined place may include the correct name and address, but the phone number is incorrect (e.g. it was changed). Upon multiple instances of receiving electronic information regarding the same place, where the name and address match that which is stored, but the phone number is consistently different, the system can consider the number of times (frequency) the "new" phone number has been provided and/or the level of trustworthiness of the users supplying the "new" phone number, and can update the phone number of record for this place once an adequate certainty level about the "new" phone number is achieved due the frequency and/or user trustworthiness of the supplied information.

When a query for electronic information is received from network 12 requesting information about a particular location and/or place, the association module 16 identifies which LPIC(s) are relevant to the query. Some or all of the electronic information stored in storage module 20 associated with the identified LPIC(s) is then retrieved and sent in response to the query, including the location and/or place information, and either the stored electronic content or pointers/links to where the electronic content is located and/or can be accessed. In addition, if the query includes any alias codes, such codes are translated by the translation module 18 to identify the LPIC(s) relevant to the query. The tremendous advantage here is that the electronic information stored locally or remotely, which can be vast, need not be searched in response to each query to determine relevance to the query. Instead, the system need only retrieve the stored electronic information previously associated with the LPIC(s) that was determined relevant to the query. This technique increases speed and efficiency, and provides query responses that are accurate to the locations and/or places defined by the query. This technique also ensures that the information provided in response to the query is up to date and accurate.

To further streamline the operation of system 14, it can optionally assign to each possible location in the covered geographic area a unique location code (LC), to simplify the management of the location data. By breaking up the covered geographical area into predetermined location points or areas of varying size and shape, and assigning each location a unique LC, the determination of what geographic location each LPIC corresponds to, or more importantly the determination of what LPIC is implicated by any given location information, can be simplified. It also makes it easier for the system 14 to provide a map of the geographical area to graphically show which location corresponds to the LPIC at issue.

The term "association" or "associate" as used herein contemplates any technique that a data base can use to link data fields (e.g. the electronic information) to one or more relevant codes (e.g. LPIC(s)), and vice versa. For example, look up tables could be used to link LPICs to certain electronic information by names or storage addresses. Alternately or additionally, electronic information stored in storage module 20 could be tagged with LPIC information by having the LPIC information added to the electronic information as stored. Similarly, translating alias codes to relevant LPICs can include any technique for linking them together, such as look up tables, information tagging, etc.

Figure 3:
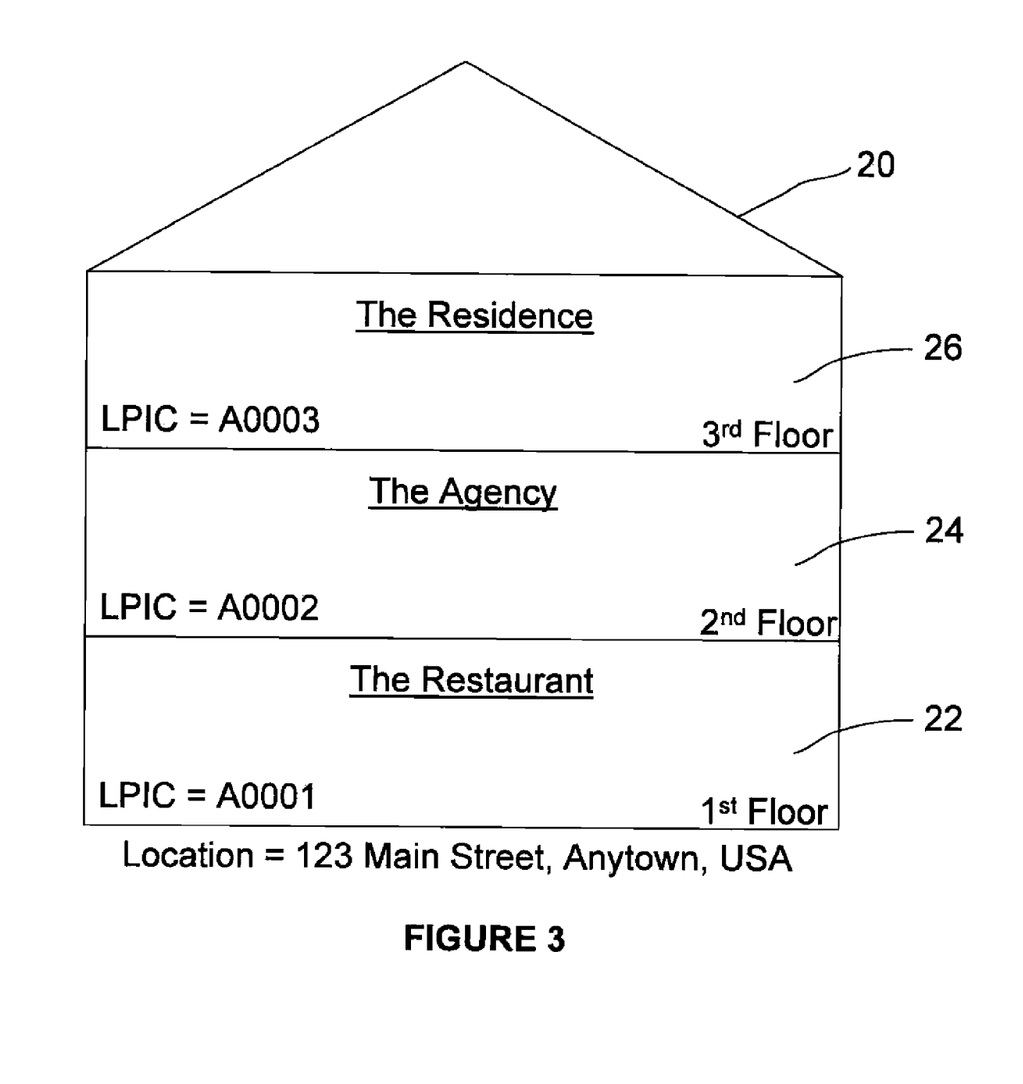
FIG. 3 is a diagram illustrating an exemplary location that includes a plurality of places.
Figure 4:
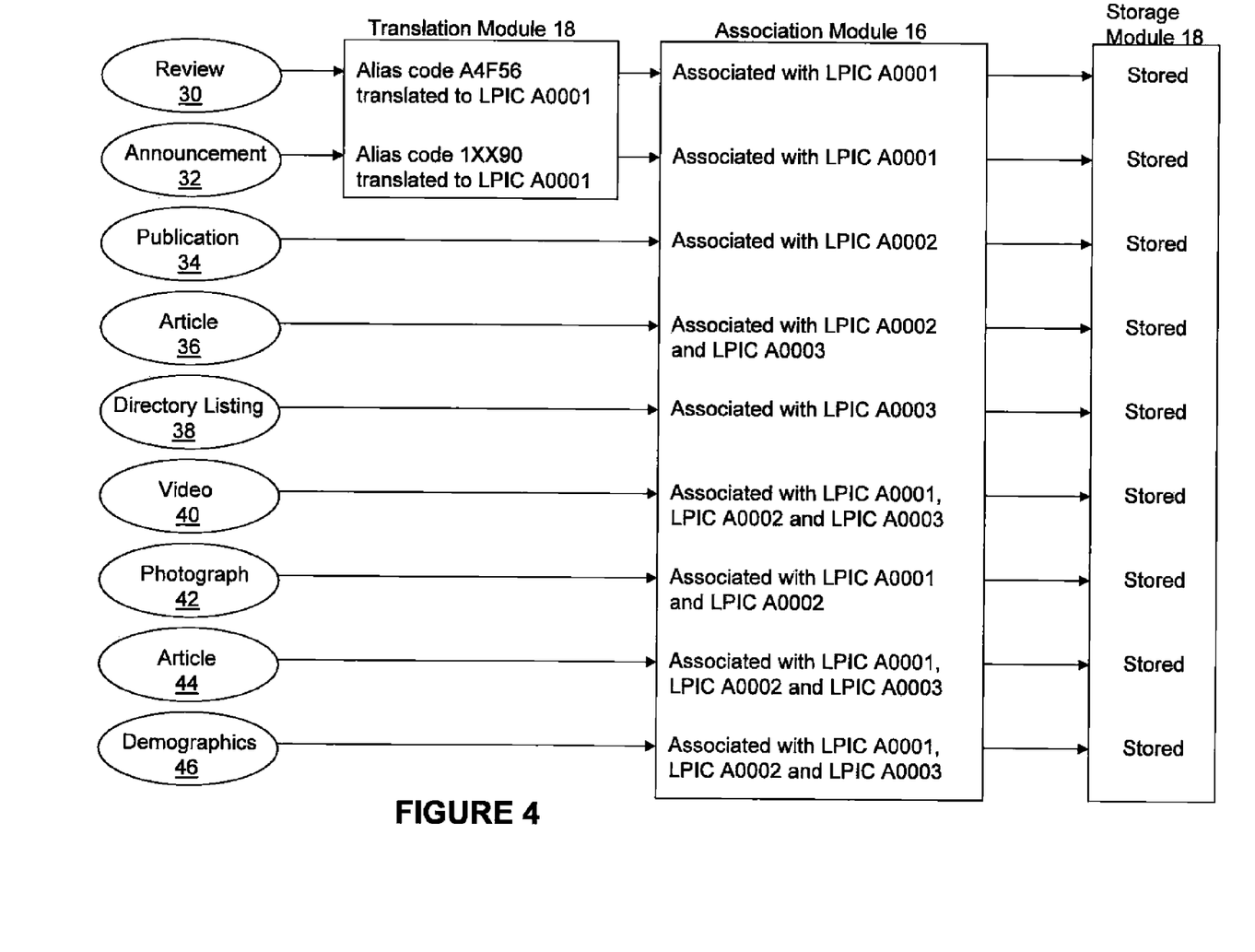
FIG. 4 is a diagram Illustrating the translation and/or association of incoming electronic information to LPICs, and the storage of the electronic information.

FIGS. 3 and 4 illustrate the operation of system 10, using the example above with respect to 123 Main Street, Anytown, USA. As shown in FIG. 3, the building 20 at that location houses The Restaurant 22 on the first floor, The Agency 24 on the second floor, and The Residence 26 on the third floor. Therefore, each of the floors define a unique place with its own place attributes, all three places being located at a single location (123 Main Street). The Restaurant is associated with a LPIC of A0001, The Agency is associated with a LPIC of A0002, and The Residence is associated with a LPIC of A0003.

FIG. 4 illustrates various electronic information received by system 14 from network 12 that relate to 123 Main Street:

The first electronic information 30 relates to a restaurant review by Reviewer, and identifies the location only by its alias code A4F56 it uses for The Restaurant. The electronic content at issue is in the form of a written review of the food and service at The Restaurant. Based on the alias code, the translation module 18 translates the alias code A4F56 to LPIC A0001. Based on the translation, the association module 16 associates electronic information 30 with LPIC A0001, and information 30 is stored in storage module 20, preferably along with the review itself or a link to the review physically stored elsewhere.

The second electronic information 32 relates to an event announcement which announces a concert at The Restaurant. It identifies the concert location by its alias code 1XX90, which corresponds to The Restaurant, and the electronic content at issue includes a photograph and video of the group giving the concert. Based on the alias code, the translation module 18 translates the alias code 1XX90 to LPIC A0001. Based on the translation, association module 16 associates electronic information 32 with LPIC A0001, and information 32 is stored in storage module 20, preferably along with the photograph and video or a link to them physically stored elsewhere.

The third electronic information 34 relates to a publication by The Agency. It contains no location, but does include the names of the author and The Agency. The electronic content at issue includes a printed publication. Based on the place information, the association module 16 associates electronic information 34 with LPIC A0002, and information 34 is stored in storage module 20, preferably along with the printed publication or a link to it physically stored elsewhere.

The fourth electronic information 36 relates to an article about the founder of The Agency, and how she lives on the third floor above her place of business. The article includes the name of the Agency and its address. The electronic content at issue is the article itself. Based on the location and place information, the association module 16 associates electronic information 36 with LPIC A0002 and LPIC A0003, and information 36 is stored in storage module 20, preferably along with the article itself or a link to it physically stored elsewhere.

The fifth electronic information 38 relates to a directory listing for the resident of The Residence. The electronic content at issue is the directly listing itself, which includes the person's name, address, suite number and telephone number. Based on the location and place information, the association module 16 associates electronic information 38 with LPIC A0003, and information 38 is stored in storage module 20, preferably along with the directly listing itself or a link to it physically stored elsewhere.

The sixth electronic information 40 relates to a video clip. The electronic content at issue is the video itself, and it contains no additional information other than a geo-tag inserted by the video camera having a GPS unit, placing the location of the video at a longitude/latitude coordinate corresponding to 123 Main Street. Based on the location information, the association module 16 associates electronic information 40 with LPIC A0001, LPIC A0002, and LPIC A0003 (because without further information, it could relate to all three places at that location), and information 40 is stored in storage module 20, preferably along with the video itself or a link to it physically stored elsewhere.

The seventh electronic information 42 relates to a photograph that includes a text caption stating "Dinner with client at The Restaurant while advertising exhibits were being completed by The Agency." The electronic content at issue if the photograph itself along with the included caption. Based on the place information in the caption, the association module 16 associates electronic information 42 with LPIC A0001 and LPIC A0002, and information 42 is stored in storage module 20, preferably along with the photograph itself or a link to it physically stored elsewhere.

The eighth electronic information 44 relates to an article about the historical building at 123 Main Street. The electronic content at issue is the article itself. Based on the location information, the association module 16 associates electronic information 44 with LPIC A0001, LPIC A0002, and LPIC A0003, and information 44 is stored in storage module 20, preferably along with the article itself or a link to it physically stored elsewhere.

The ninth electronic information 46 relates to demographic information about the neighborhood that includes 123 Main Street. The electronic content at issue is the demographic information itself. Based on the location information, the association module 16 associates electronic information 44 with LPIC A0001, LPIC A0002, and LPIC A0003 (along with other LPICs for other locations in that neighborhood), and information 46 is stored in storage module 20, preferably along with the demographic information itself or a link to it physically stored elsewhere.

In each of the above examples, the received electronic information could include just the location/place related information and/or alias code for the underlying electronic content, or just the underlying electronic content itself, or both.

Figure 5:
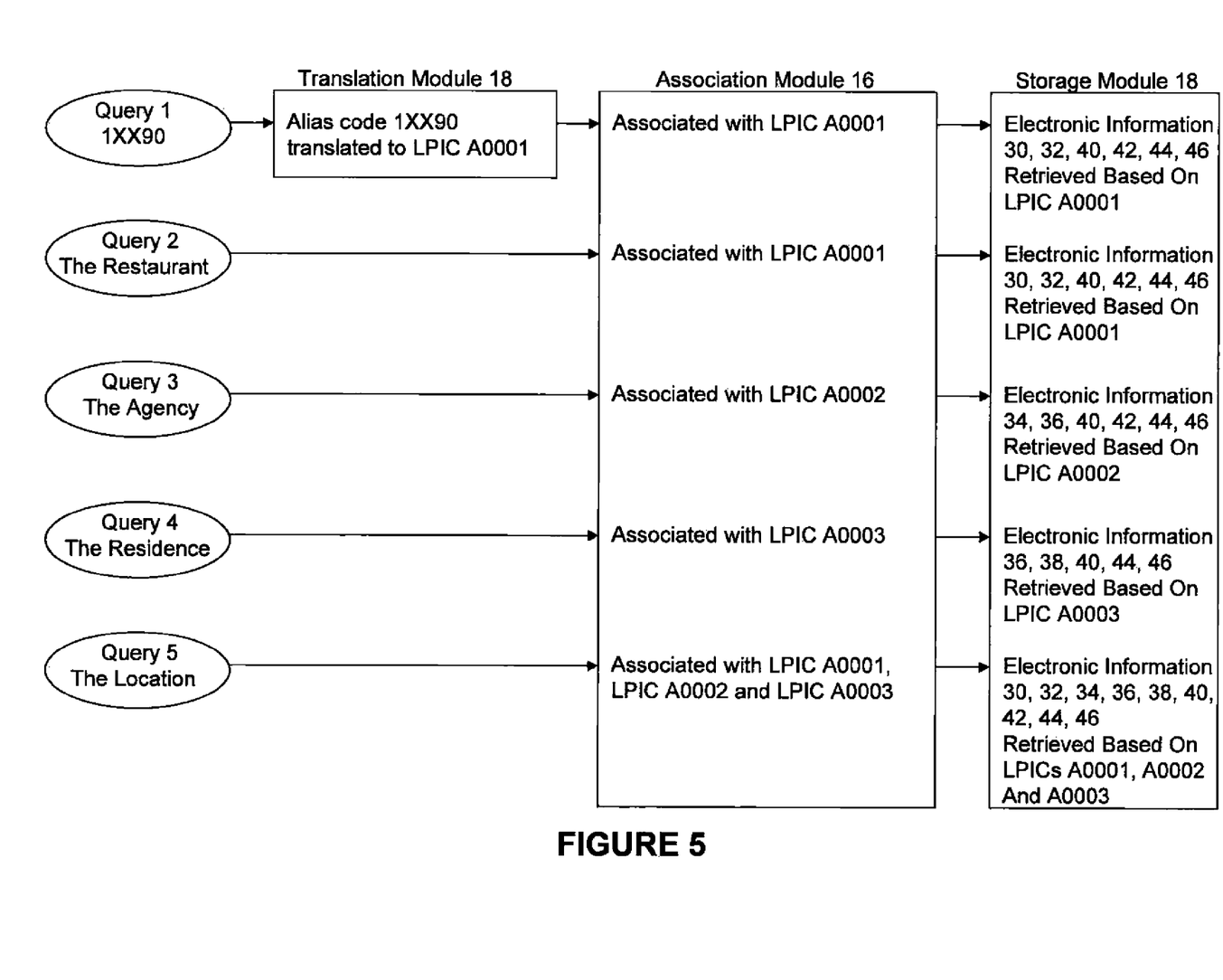
FIG. 5 is a diagram illustrating the translation and/or association of incoming queries to the LPICs, and the retrieval of stored electronic information based upon the associated LPICs.

FIG. 5 illustrates queries to system 14, and which electronic information is retrieved and provided in response to the queries:

Query 1 requests information relating to alias code 1XX90. Translation module 18 translates this alias code to LPIC A0001. Based on this translation, association module 16 associates this query with LPIC A0001, and system 14 retrieves and provides stored information from storage module 20 that is associated with this LPIC number (electronic information 30, 32, 40, 42, 44, 46) in response to this query.

Query 2 requests information relating to The Restaurant. Association module 16 associates this query with LPIC A0001, and system 14 retrieves and provides stored information from storage module 20 that is associated with this LPIC number (electronic information 30, 32, 40, 42, 44, 46) in response to this query.

Query 3 requests information relating to The Agency. Association module 16 associates this query with LPIC A0002, and system 14 retrieves and provides stored information from storage module 20 that is associated with this LPIC number (electronic information 34, 36, 40, 42, 44, 46) in response to this query.

Query 4 requests information relating to The Residence. Association module 16 associates this query with LPIC A0003, and system 14 retrieves and provides stored information from storage module 20 that is associated with this LPIC number (electronic information 36, 38, 40, 44, 46) in response to this query.

Query 5 requests information relating to the location 123 Main Street. Association module 16 associates this query with LPIC A0001, LPIC A0002 and LPIC A0003, and system 14 retrieves and provides stored information from storage module 20 that is associated with these LPIC numbers (electronic information 30, 32, 34, 36, 38, 40, 42, 44, 46) in response to this query.

As evident from the above example, the storage and retrieval of electronic information is streamlined because incoming electronic information can be associated with the relevant LPICs at the time of receipt and/or storage in the data base. This allows the system to keep the stored electronic information or links to it (and the LPICs used to access that information) accurate and current. Then, when a query seeking electronic information relevant to a particular location or place is received, the system need only identify which LPIC(s) are implicated by the query, and the electronic information associated with the identified LPIC(s) can be efficiently retrieved based on the pre-existing association, no matter when the various incoming electronic information were received. This avoids the need to conduct complex searching of the electronic information every time a query is received.

Another feature of the data storage system 14 includes efficient identification of location and place information for individual electronic information. Users can submit electronic information of unknown origin, and the data storage system 14 can efficiently identify location and place information relating to the submitted electronic information. For example, a user needs to know the precise location/place information regarding the spot from which a photograph of the Eifel Tower was taken. The photograph includes a geo-tag identifying longitude/latitude coordinates sufficient to limit the location to a certain city block. The photograph also includes the text caption "View from rooftop café." The association module can use known location/place information for all places in or near that city block to determine that, of the many places that define cafés in that area, only one of them is located on the top floor of the respective building. The system 14 would then provide to the user the location and place information for that place: Café Pierre, with its precise location and other relevant place information about that café.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may eventually be covered by one or more of the claims. Further, as is apparent from the above disclosure, not all method steps need be performed in the exact order illustrated or claimed, but rather can be in any order that allows for the receipt, the LPIC association, and the storage of electronic information, as well as the retrieval of stored electronic information associated with relevant LPICs.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

What is claimed is:

1. A method of processing electronic information, comprising:
    generating a plurality of identifier codes each of which corresponds to a location and/or a place using an association module in communication with a network;
    receiving a plurality of electronic information from the network using the association module, wherein each electronic information has a relevancy to one or more locations and/or places, and wherein the plurality of electronic information includes a first electronic data and a second electronic data both of which are associated with a same one location and/or place, and wherein the first electronic data containing location and/or place information that contradicts that of the second electronic data;
    determining which of the contradictory location and/or place information is to be associated with the same one location and/or place
    for each of the received plurality of electronic information, associating the electronic information using the association module with any of the identifier codes that correspond to the one or more locations and/or places having the relevancy to the electronic information;
    receiving a query relevant to at least one of the locations and/or places using the association module;
    identifying any of the identifier codes that correspond to the at least one of the locations and/or places relevant to the query using the association module;
    responding to the query by providing the electronic information that are associated with the identified identifier codes using the association module;
    for each of the received plurality of electronic information:
        storing at least a portion of the electronic information in a storage device; and
        the providing includes retrieving the stored portion of the electronic information from the storage device; and
    providing a plurality of users access rights to the stored electronic information in the storage device, wherein the access rights vary among the plurality of users.

2. The method of claim 1, wherein the determining is based upon at least one of sources of the first and second electronic data, and a number of times each of the contradictory location and/or place information has been received.

3. The method of claim 1, wherein the determining includes assigning a reliability value to each of the contradictory location and/or place information.

4. A system for processing electronic information, comprising:
    an association module in communication with a network, the association module being configured to:
        generate a plurality of identifier codes each of which corresponds to a location and/or a place,
        receive a plurality of electronic information from the network, wherein each electronic information has a relevancy to one or more location and/or places,
        associate each of the received plurality of electronic information with any of the identifier codes that correspond to the one or more locations and/or places having the relevancy to the electronic information,
        receive a query relevant to at least one of the locations and/or places,
        identify any of the identifier codes that correspond to the at least one of the locations and/or places relevant to the query, and
        respond to the query by providing the electronic information that are associated with the identified identifier codes; and
    a storage module for storing at least a portion of each of the received plurality of electronic information and for retrieving the stored portions of the electronic information, wherein the storage module is configured to provide a plurality of users access rights to the stored electronic information in the storage device, and wherein the access rights vary among the plurality of users;
    wherein:
        the plurality of electronic information includes a first electronic data and a second electronic data both of which are associated with a same one location and/or place;
        the first electronic data containing location and/or place information that contradicts that of the second electronic data; and
        the association module is configured to determine which of the contradictory location and/or place information is to be associated with the same one location and/or place.

5. The system of claim 4, wherein the association module is configured to perform the determining based upon at least one of sources of the first and second electronic data, and a number of times each of the contradictory location and/or place information has been received.

6. The system of claim 4, wherein the association module is configured to perform the determining by assigning a reliability value to each of the contradictory location and/or place information.

* * * * *